United States Patent
Zheng et al.

(10) Patent No.: US 12,480,679 B2
(45) Date of Patent: Nov. 25, 2025

(54) AIR CONDITIONER AND DATA TRANSMISSION METHOD BASED ON POWER LINE COMMUNICATION THEREFOR, AND STORAGE MEDIUM

(71) Applicants: FOSHAN SHUNDE MIDEA ELECTRIC SCIENCE AND TECHNOLOGY CO., LTD., Guangdong (CN); GD MIDEA AIR-CONDITIONING EQUIPMENT CO., LTD., Guangdong (CN)

(72) Inventors: Chengli Zheng, Guangdong (CN); Wujun Zhang, Guangdong (CN)

(73) Assignees: FOSHAN SHUNDE MIDEA ELECTRIC SCIENCE AND TECHNOLOGY CO., LTD., Guangdong (CN); GD MIDEA AIR-CONDITIONING EQUIPMENT CO., LTD., Guangdong (CN)

( * ) Notice: Subject to any disclaimer, the term of this patent is extended or adjusted under 35 U.S.C. 154(b) by 34 days.

(21) Appl. No.: 18/384,512

(22) Filed: Oct. 27, 2023

(65) Prior Publication Data
US 2024/0053042 A1  Feb. 15, 2024

Related U.S. Application Data

(63) Continuation of application No. PCT/CN2021/119021, filed on Sep. 17, 2021.

(30) Foreign Application Priority Data

Apr. 30, 2021 (CN) .......................... 202110482458.5

(51) Int. Cl.
*H04B 3/54* (2006.01)
*F24F 11/56* (2018.01)

(52) U.S. Cl.
CPC ................ *F24F 11/56* (2018.01); *H04B 3/54* (2013.01)

(58) Field of Classification Search
CPC .. F24F 11/56; F24F 11/30; F24F 11/63; F24F 11/50; F24F 1/22; F24F 11/64; H04B 3/54; H04B 3/542
See application file for complete search history.

(56) References Cited

U.S. PATENT DOCUMENTS 5,581,229 A * 12/1996 Hunt ................. H02J 13/00034
340/953
2013/0298576 A1  11/2013 Kim et al.
(Continued)

FOREIGN PATENT DOCUMENTS

| CN | 2859328 Y | 1/2007 |
| CN | 101660825 A | 3/2010 |

(Continued)

OTHER PUBLICATIONS

Extended European search report dated Jul. 12, 2024 received in European Patent Application No. 21938842.8.
(Continued)

*Primary Examiner* — David S Huang
(74) *Attorney, Agent, or Firm* — Scully, Scott, Murphy & Presser, P.C.

(57) ABSTRACT

An air conditioner and a data transmission method based on power line communication therefor, and a storage medium are provided. According to the method, a working parameter is acquired by an indoor unit; if it is determined that the working parameter meets a set condition, a communication interval is adjusted through an outdoor unit from a first communication interval to a second communication interval; and communication data is sent to the outdoor unit on the basis of the second communication interval and by means of a power line. In order to send the communication
(Continued)

data to the outdoor unit, the communication data is modulated by the indoor unit into multiple sub-carrier signals and the sub-carrier signals are coupled to the power line. Each sub-carrier signal corresponds to a different frequency band, and the first communication interval is larger than the second communication interval.

14 Claims, 3 Drawing Sheets

(56) References Cited

U.S. PATENT DOCUMENTS

| | | | | |
|---|---|---|---|---|
| 2015/0323215 | A1* | 11/2015 | Arensmeier | F24F 11/52 702/182 |
| 2015/0330650 | A1* | 11/2015 | Abiprojo | F24F 11/30 700/276 |
| 2021/0006291 | A1* | 1/2021 | Yu | H04B 3/04 |

FOREIGN PATENT DOCUMENTS

| | | |
|---|---|---|
| CN | 101998497 A | 3/2011 |
| CN | 102111242 A | 6/2011 |
| CN | 103036831 A | 4/2013 |
| CN | 104833055 A | 8/2015 |
| CN | 105371424 A | 3/2016 |
| CN | 105873194 A | 8/2016 |
| CN | 106533506 A | 3/2017 |
| CN | 206073362 U | 4/2017 |
| CN | 107872248 A | 4/2018 |
| CN | 108266930 A | 7/2018 |
| CN | 108548268 A | 9/2018 |
| CN | 108566230 A | 9/2018 |
| CN | 108592355 A | 9/2018 |
| CN | 109067432 A | 12/2018 |
| CN | 111371474 A | 7/2020 |
| CN | 111404792 A | 7/2020 |
| CN | 111835609 A | 10/2020 |
| CN | 112283914 A | 1/2021 |
| CN | 113483462 A | 10/2021 |
| JP | H04322519 A | 11/1992 |
| JP | 2005201504 A | 7/2005 |
| JP | 2007228440 A | 9/2007 |
| KR | 20170085333 A | 7/2017 |

OTHER PUBLICATIONS

International Search Report and Written Opinion dated Jan. 26, 2022 received in International Application No. PCT/CN2021/119021.

First Office Action dated Feb. 25, 2022 received in Chinese Patent Application No. CN 202110482458.5.

Notification of Grant of Invention Patent dated Sep. 28, 2022 received in Chinese Patent Application No. CN 202110482458.5.

Ye et al,"Design and Implementation of Air Conditioning Control System Based on Power Line Carrier Communication", published on Aug. 2020, China Academic Journal Electronic Publishing House. 5 pages.

* cited by examiner

AIR CONDITIONER AND DATA TRANSMISSION METHOD BASED ON POWER LINE COMMUNICATION THEREFOR, AND STORAGE MEDIUM

CROSS-REFERENCE TO RELATED APPLICATIONS

This application is a continuation application of PCT International Patent Application No. PCT/CN2021/119021, filed on Sep. 17, 2021, which claims priority to and benefits of Chinese Patent application No. 202110482458.5 filed on Apr. 30, 2021, the entire contents of each of which are hereby incorporated by reference for all purposes. No new matter has been introduced.

TECHNICAL FIELD

The disclosure relates to the field of Power Line Communication (abbreviated as "PLC"), and in particular to an air conditioner, a PLC-based data transmission method therefore, and a storage medium.

BACKGROUND

PLC refers to a communication method for transmitting data and media signals by using a power line. A sending side modulates user data by using a modulation technology, loads a carrier signal carrying information on the power line, and then transmits the carrier signal on the power line. A receiving side demodulates the user data by using a demodulation technology, and takes it out of the power line.

In the related art, PLC-based electronic devices usually make communication based on a carrier in a selected band. However, as the number of household appliances on a power network increases, carrier signals transmitted on the power line are prone to being affected by electromagnetic interferences of the household appliances on the power network, for example, interfered by noise from the household appliances, such as an induction cooker, a microwave oven, a hair dryer or the like, which affects reliability of communication.

SUMMARY

In view of this, embodiments of the disclosure provide an air conditioner, a PCL-based data transmission method therefore, and a storage medium, which are intended to effectively improve reliability of PLC-based communication of the air conditioner.

An embodiment of the disclosure provides a PLC-based data transmission method for an air conditioner, the air conditioner includes an outdoor unit and an indoor unit connected to a power line respectively, the method includes the following operations.

The indoor unit acquires operation parameters.

The indoor unit adjusts a communication interval with the outdoor unit from a first communication interval to a second communication interval, in response to determining, by the indoor unit, that the operation parameters meet a set condition.

The indoor unit sends communication data to the outdoor unit through the power line based on the second communication interval.

The operation of sending the communication data to the outdoor unit through the power line includes the following operations.

The indoor unit modulates the communication data into multiple sub-carrier signals, and couples multiple sub-carrier signals to the power line.

Each of the sub-carrier signals corresponds to a different band, and the first communication interval is greater than the second communication interval.

In some implementations, the operation of determining, by the indoor unit, that the operation parameters meet the set condition may include the following operations.

The indoor unit determines that at least one of acquired operation mode, set temperature, set wind speed or target frequency changes.

In some implementations, the method may further include the following operations.

The indoor unit maintains the first communication interval in response to determining that the operation parameters are the same as historical operation parameters of a previous time period.

The indoor unit sends the communication data to the outdoor unit through the power line based on the first communication interval.

In some implementations, the method may further include the following operations after sending, by the indoor unit, the communication data to the outdoor unit through the power line based on the second communication interval.

The indoor unit restores the communication interval with the outdoor unit to the first communication interval.

In some implementations, the operation of restoring, by the indoor unit, the communication interval with the outdoor unit to the first communication interval may include the following operations.

The indoor unit restores the communication interval with the outdoor unit to the first communication interval based on a feedback instruction of receiving the communication data fed back by the outdoor unit.

In some implementations, the indoor unit may include an indoor unit controller and a first PLC device, and the operation of modulating, by the indoor unit, the communication data into multiple sub-carrier signals, and coupling, by the indoor unit, multiple sub-carrier signals to the power line may include the following operations.

The indoor unit controller sends the communication data to the first PLC device.

The first PLC device codes and modulates the received communication data to obtain multiple sub-carrier signals.

The first PLC device couples multiple sub-carrier signals to the power line.

In some implementations, the method may further include the following operations.

The outdoor unit extracts multiple sub-carrier signals transmitted on the power line, and demodulates and decodes multiple sub-carrier signals to restore the communication data.

In some implementations, the outdoor unit may include an outdoor unit controller and a second PLC device, and the operation of extracting, by the outdoor unit, multiple sub-carrier signals coupled on the power line, and demodulating and decoding, by the outdoor unit, multiple sub-carrier signals may include the following operations.

The second PLC device extracts multiple sub-carrier signals coupled on the power line.

The second PLC device demodulates and decodes multiple sub-carrier signals to restore the communication data.

In some implementations, the method may further include the following operations.

The second PLC device sends the communication data to the outdoor unit controller in response to determining that the communication data conforms to a set communication protocol.

In some implementations, the method may further include the following operations.

The second PLC device discards the communication data in response to determining that the communication data does not conform to the set communication protocol.

In some implementations, the method may further include the following operations.

The indoor unit determines a band of each of the sub-carrier signals based on a pre-built noise library, the noise library includes a noise band whose noise amplitude value is equal to or greater than a set threshold, and the band of each of the sub-carrier signals is different from the noise band.

In some implementations, the method may further include the following operations.

The indoor unit acquires environmental noise data on the power line.

The indoor unit updates the noise library based on a noise band in the environmental noise data whose noise amplitude value is equal to or greater than the set threshold.

The indoor unit adjusts the band of each of the sub-carrier signals based on the updated noise library.

An embodiment of the disclosure further provides an air conditioner, the air conditioner includes an indoor unit and an outdoor unit connected to a power line respectively. The indoor unit and the outdoor unit are configured to execute operations of the method according to the embodiments of the disclosure when the indoor unit and the outdoor unit run a computer program.

An embodiment of the disclosure further provides a storage medium, having stored thereon a computer program, the computer program implements operations of the method according to the embodiments of the disclosure when the computer program is executed by a processor.

According to certain embodiments of the disclosure, the indoor unit acquires operation parameters; the indoor unit adjusts a communication interval with the outdoor unit from a first communication interval to a second communication interval, in response to determining that the operation parameters meet a set condition; the indoor unit sends communication data to the outdoor unit through the power line based on the second communication interval. The operation of sending the communication data to the outdoor unit through the power line includes the following operations. The indoor unit modulates the communication data into multiple sub-carrier signals, and couples multiple sub-carrier signals to the power line. Each of the sub-carrier signals corresponds to a different band, and the first communication interval is greater than the second communication interval. According to the embodiments, on one hand, the communication interval between the indoor unit and the outdoor unit may be determined according to operation states of the air conditioner, which may effectively reduce PLC-based data transmission frequency, thereby effectively preventing data transmission blocking; on the other hand, simultaneous transmission is performed by using multiple sub-carrier signals, which may effectively increase anti-noise interference capability of PLC-based data transmission, thereby improving data transmission reliability.

DETAILED DESCRIPTION

Figure 1:
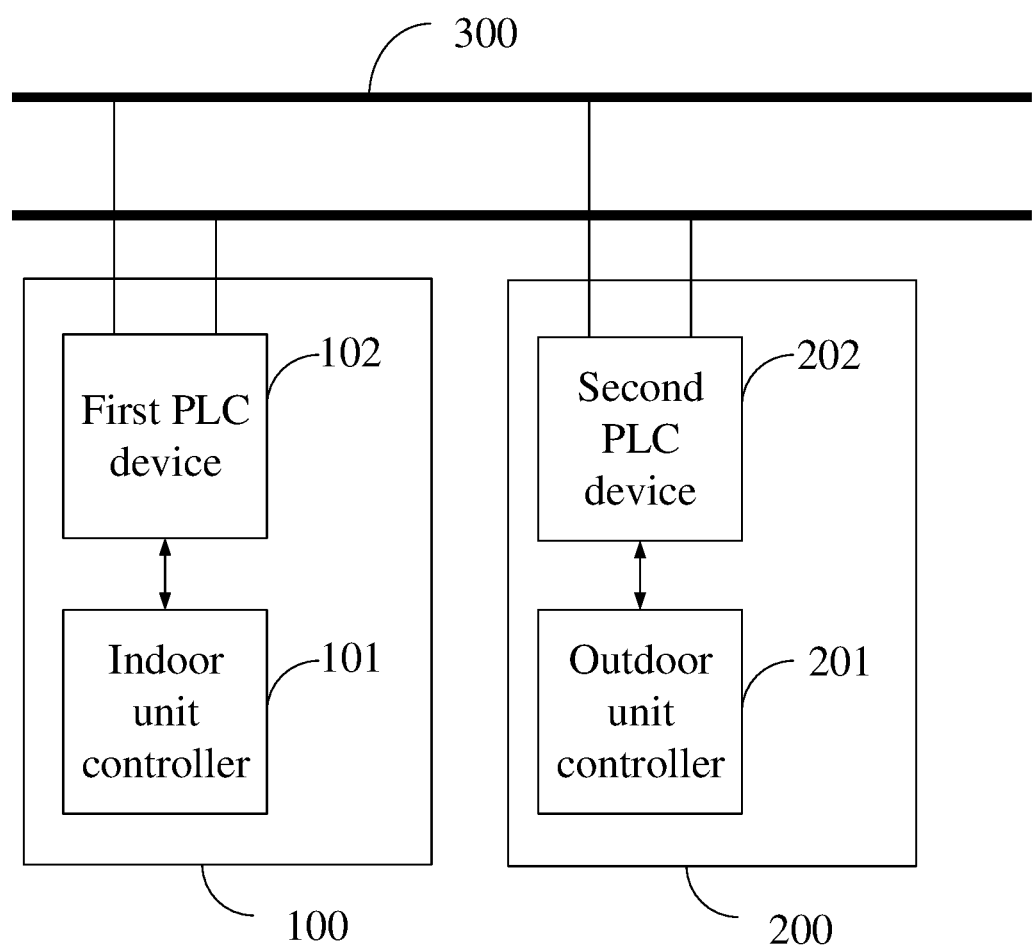
FIG. 1 is a schematic structural diagram of an air conditioner based on PLC according to an embodiment of the disclosure.

The disclosure will be further described in detail below with reference to the drawings and embodiments.

Unless defined otherwise, all technical and scientific terms used here have the same meaning as usually understood by technicians in the technical field to which the disclosure belongs. The terms used here in the description of the disclosure are only for the purpose of describing specific embodiments, and are not intended to limit the disclosure.

For the convenience of descriptions, terms involved in the embodiments of the disclosure are explained as follows.

Power Line Communication (PLC): refers to a technology of modulating an analog or digital signal by way of a carrier, and then coupling the modulated signal to a power line for transmission.

Communication interval: refers to an interval time period of transmission of adjacent data frames.

Coding: refers to conversion of information from a form or format to another form; for example, using a pre-prescribed method to code words, numbers or other objects into numerical codes, or to convert information and data into prescribed electrical pulse signals.

Modulation: refers to a process of changing some parameters (such as amplitude, frequency, etc.) of a signal (such as light, high-frequency electromagnetic oscillation, etc.) according to characteristics of another to-be-transmitted information (such as sound, image, etc.).

Demodulation: refers to a process of restoring original information from a modulated signal carrying the original information.

Decoding: refers to an inverse process of coding, that is, a process of restoring the coded information to original information before coding.

Band: refers to a frequency range of a power carrier.

In the related art, an air conditioner is usually composed of an indoor unit and an outdoor unit, the outdoor unit includes a compressor and a condenser, the indoor unit includes an evaporator and a fan, and the outdoor unit is connected to the indoor unit through refrigerant pipes. Taking a refrigeration process as an example, the compressor compresses a gaseous refrigerant (such as, Freon) into a liquid refrigerant with high temperature and high pressure, and then sends the liquid refrigerant to the condenser for heat dissipation, thereby forming a liquid refrigerant with medium temperature and medium pressure; the liquid refrigerant formed by the condenser enters the evaporator of the indoor unit through refrigerant pipes. Due to sudden increase of space and decrease of pressure, the liquid refrigerant is vaporized, a large amount of heat is absorbed in a process of converting from a liquid state to a gaseous state, and the evaporator may become cold at this time. When the fan of the indoor unit blows indoor air through the evaporator, the fan of the indoor unit may blow cold air out.

During operation, the outdoor unit also needs to communicate with the indoor unit. For example, the indoor unit sends a control instruction to the outdoor unit to control an operation mode of the outdoor unit (for example, start the compressor, etc.), and the outdoor unit sends its own operation status, environmental parameters, fault codes, or the like to the indoor unit.

In the related art, it usually needs to provide a separate communication line between the outdoor unit and the indoor unit. Especially in case of a multi-unit-connected air conditioner unit, it needs a Controller Area Network (CAN) bus or 485 bus connected and arranged from the outdoor unit to each indoor unit, to achieve connection, control and communication, resulting in drawbacks such as complex installation, high material and labor costs, inconvenient maintenance, etc.

On the above basis, an embodiment of the disclosure provides an air conditioner based on PLC. As shown in FIG. 1, the air conditioner based on PLC includes an indoor unit 100 and an outdoor unit 200, the indoor unit 100 is connected to the outdoor unit 200 through refrigerant pipes, the indoor unit 100 and the outdoor unit 200 are connected to a power line 300 respectively and communicate via PLC signals transmitted on the power line 300.

It should be noted that the air conditioner according to the embodiment of the disclosure is configured to adjust temperature, humidity, or the like of the environment where the air conditioner is located. The air conditioner may be a single-refrigerating air conditioner or a dual-purpose air conditioner, and may be a wall-mounted air conditioner, a vertical cabinet air conditioner, a window-mounted air conditioner, a ceiling-mounted air conditioner, or other forms of air conditioners, which are not specifically limited in the embodiment of the disclosure.

The air conditioner may be an independent air conditioner of which indoor units correspond to outdoor units one-to-one, or may be a multi-unit-connected air conditioner unit, which are not specifically limited in the embodiment of the disclosure.

It may be understood that the multi-unit-connected air conditioner unit, also known as "one-to-multiple" air conditioner unit, refers to an air conditioner unit composed of one air conditioner outdoor unit (i.e., outdoor unit) connecting to and controlling two or more air conditioner indoor units (i.e., indoor units). For example, in the multi-unit-connected air conditioner unit, the air conditioner outdoor unit transmits refrigerant (heating agent) to two or more air conditioner indoor units through pipes, and the air conditioner outdoor unit controls a circulation volume of the refrigerant (heating agent) and a flow rate of the refrigerant (heating agent) entering the indoor unit, to adjust and meet temperature regulation requirements of the air conditioner indoor unit. Furthermore, each air conditioner indoor unit may control the air conditioner outdoor unit through independent parameter settings, to meet temperature and/or humidity requirements of different rooms. In case of the multi-unit-connected air conditioner unit, corresponding PLC devices may be provided on each indoor unit side and the outdoor unit side, to achieve communication and connection based on the power line, which may prevent connecting and arranging the CAN bus or 485 bus from the outdoor unit to each indoor unit, to achieve connection, control and communication, resulting in drawbacks such as complex installation, high material and labor costs, inconvenient maintenance, etc. Therefore, a communication network is constructed by using arranged power lines, which has low arrangement cost and is convenient for maintenance.

Exemplarily, as shown in FIG. 1, the indoor unit 100 includes an indoor unit controller 101 and a first PLC device 102. The indoor unit controller 101 may be communicatively connected to the first PLC device 102, for example, through a serial port data line. The first PLC device 102 is coupled and connected to the power line 300, to couple PLC signals to the power line and extract PLC signals from the power line 300.

Exemplarily, as shown in FIG. 1, the outdoor unit 200 includes an outdoor unit controller 201 and a second PLC device 202. The outdoor unit controller 201 may be communicatively connected to the second PLC device 202, for example, through a serial port data line. The second PLC device 202 is coupled and connected to the power line 300, to couple PLC signals to the power line and extract PLC signals from the power line 300.

In an actual application, PLC signals between the indoor unit 100 and the outdoor unit 200 of the air conditioner are easily affected by electromagnetic interferences of household appliances on a power network, for example, interfered by noise from the household appliances such as an induction cooker, a microwave oven, a hair dryer or the like, which affects reliability of communication.

Figure 2:
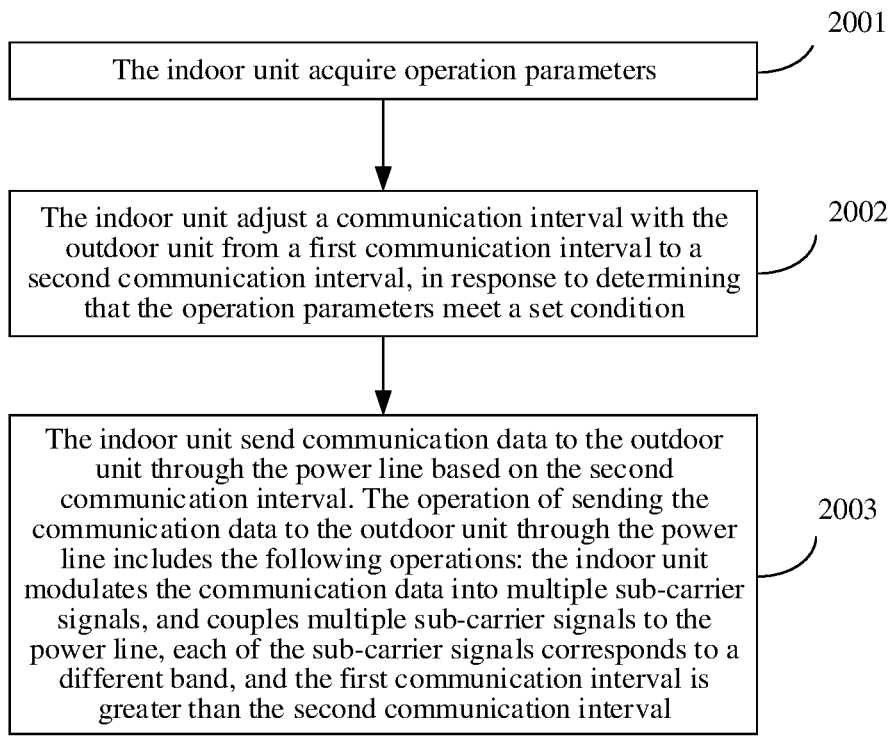
FIG. 2 is a schematic flowchart of a PLC-based data transmission method for an air conditioner according to an embodiment of the disclosure.

On the above basis, an embodiment of the disclosure provides a PLC-based data transmission method for an air conditioner, the air conditioner includes an outdoor unit and an indoor unit connected to a power line respectively. As shown in FIG. 2, the data transmission method includes the following operations 2001 to 2003.

At 2001, the indoor unit acquires operation parameters.

Here, the indoor unit may acquire operation parameters representing operation control requirements and/or operation conditions of the air conditioner.

Exemplarily, the operation parameters may include at least one of an operation mode, a set temperature, a set wind speed or a target frequency. The operation mode may include, but is not limited to, a heating mode, a refrigerating mode, a dehumidification mode, a sleep mode, etc. The set temperature may be a temperature adjustment target value selected by a user based on control requirements. The set wind speed may be a wind speed adjustment target value selected by the user based on control requirements. The target frequency may be a frequency value at which a frequency transformer operates, determined by the indoor unit based on a difference between ambient temperature detected by a temperature sensor and the set temperature.

Exemplarily, the indoor unit may periodically acquire operation parameters based on a set acquisition frequency.

It may be understood that the user may also adjust part of operation parameters based on input means such as a remote controller, a key, etc. For example, the indoor unit may receive control instructions of changing the operation mode, the set temperature or the set wind speed sent by the user through the remote controller, the indoor unit may update corresponding operation parameters based on the received control instructions.

It may be understood that the indoor unit may acquire the ambient temperature detected by the temperature sensor based on a set acquisition frequency, and determine whether the target frequency value is updated based on the difference between the ambient temperature and the set temperature. For example, the indoor unit selects a corresponding frequency value based on an interval corresponding to the difference, and determines whether the target frequency value is updated based on the selected frequency value; when the selected frequency value is different from a current target frequency value, the indoor unit updates the current target frequency value to the selected frequency value.

At 2002, the indoor unit adjusts a communication interval with the outdoor unit from a first communication interval to a second communication interval, in response to determining, by the indoor unit, that the operation parameters meet a set condition.

It may be understood that during normal operation after the air conditioner is started, data transmission is performed between the indoor unit and the outdoor unit based on the initial first communication interval. As an example rather than limiting description, the first communication interval may be 5 seconds, that is, an interval time period for the indoor unit to transmit adjacent data frames to the outdoor unit based on the power line is 5 seconds. The indoor unit may send operation parameters of the indoor unit to the outdoor unit through the power line based on the first communication interval, so that the outdoor unit may update local control strategies.

Exemplarily, the indoor unit may take each operation parameter as independent communication data respectively, and send each operation parameter to the outdoor unit based on the default first communication interval. For example, the indoor unit sequentially sends the foregoing operation mode, set temperature, set wind speed and target frequency based on the first communication interval. Based on size design of data frame, the indoor unit may also send part or all of the operation parameters to the outdoor unit based on the first communication interval. For example, the indoor unit divides the foregoing operation mode, set temperature, set wind speed and target frequency into at least one communication data, and sends the communication data according to the first communication interval, which is not specifically limited in the disclosure.

Exemplarily, the operation of determining, by the indoor unit, that the operation parameters meet the set condition includes the following operations.

The indoor unit determines that at least one of acquired operation mode, set temperature, set wind speed or target frequency changes.

In other words, when the indoor unit determines that at least one of the acquired operation mode, set temperature, set wind speed or target frequency changes compared to corresponding historical parameters of a previous time period, the indoor unit determines that the operation parameters meet the set condition, and adjusts the communication interval with the outdoor unit from the first communication interval to the second communication interval.

Here, the second communication interval is less than the first communication interval, thereby shortening a delay for establishing communication between the indoor unit and the outdoor unit. As an example rather than limiting description, the second communication interval may be 50 milliseconds, that is, an interval time period for the indoor unit to transmit adjacent data frames to the outdoor unit based on the power line is 50 milliseconds, and the indoor unit may send operation parameters of the indoor unit to the outdoor unit through the power line based on the second communication interval, so that the outdoor unit may obtain the operation parameters of the indoor unit side more quickly, and then update local control strategies.

At 2003, the indoor unit sends communication data to the outdoor unit through the power line based on the second communication interval. The operation of sending the communication data to the outdoor unit through the power line includes the following operations. The indoor unit modulates the communication data into multiple sub-carrier signals, and couples multiple sub-carrier signals to the power line. Each of the sub-carrier signals corresponds to a different band, and the first communication interval is greater than the second communication interval.

Here, the communication data may be one or more of the foregoing operation parameters of the indoor unit. That is, the communication data may be one or more of the foregoing operation mode, set temperature, set wind speed and target frequency.

It may be understood that the indoor unit modulates the communication data into multiple sub-carrier signals, that is, the same communication data is transmitted to the outdoor unit through multiple sub-carrier signals on the power line, and each sub-carrier corresponds to a different band, which improves data transmission reliability, and ensures a successful communication rate of PLC signals in an interference environment.

Furthermore, it should be noted that when the operation parameters of the indoor unit are transmitted through multiple communication data based on a communication protocol, and each communication data is sent based on the second communication interval, so that delay for the outdoor unit to acquire the operation parameters of the indoor unit may be reduced, which facilitates the outdoor unit to respond quickly when the operation parameters of the indoor unit change.

In some embodiments, the data transmission method further includes the following operations.

The indoor unit maintains the first communication interval in response to determining that the operation parameters are the same as historical operation parameters of a previous time period.

The indoor unit sends the communication data to the outdoor unit through the power line based on the first communication interval.

It may be understood that when the indoor unit determines that the operation parameters are the same as historical operation parameters of the previous time period, it indicates that current operation parameters do not change, and the indoor unit maintains the first communication interval. In this way, adjacent data frames are transmitted based on an interval time period of 5 seconds, which may reduce amount of data transmitted in the power line-based communication network and effectively prevent data transmission blocking.

It may be understood that when the indoor unit sends the communication data based on the first communication interval, the indoor unit modulates the communication data into multiple sub-carrier signals, that is, the same communication data is transmitted to the outdoor unit through multiple sub-carrier signals on the power line, and each sub-carrier corresponds to a different band, which improves data transmission reliability, and ensures a successful communication rate of PLC signals in an interference environment.

In some embodiments, the indoor unit may also determine a band of each of the sub-carrier signals based on a pre-built noise library, the noise library includes a noise band whose noise amplitude value is equal to or greater than a set threshold, and the band of each of the sub-carrier signals is different from the noise band.

In an actual application, noise data of various household appliances (for example, the foregoing household appliances such as an induction cooker, a microwave oven, a hair dryer or the like) commonly used in the power network may be acquired based on a noise acquisition device. Exemplarily, the noise acquisition device may send the acquired noise data of various household appliances to the cloud, the cloud compares a noise amplitude value of the received noise data to a set threshold and adds a noise band whose noise amplitude value is equal to or greater than the set value to the noise library of the power network, and the noise library may be transmitted to the indoor unit and stored on a local side of the indoor unit. In this way, the indoor unit may initialize the band of each sub-carrier based on the noise library, so that the band of each sub-carrier avoids each noise band in the noise library, thereby improving data transmission reliability.

In some embodiments, the data transmission method further includes the following operations.

The indoor unit acquires environmental noise data on the power line.

The indoor unit updates the noise library based on a noise band in the environmental noise data whose noise amplitude value is equal to or greater than the set threshold.

The indoor unit adjusts the band of each of the sub-carrier signals based on the updated noise library.

It may be understood that the indoor unit may acquire the environmental noise data on the power line during operation, and determine, based on the set threshold, whether the environmental noise data has noise equal to or greater than the set threshold; if yes, the indoor unit may add a noise band of the corresponding noise to the noise library, so that the noise library may be updated based on online environmental noise data, and the band of each sub-carrier signal may be adjusted based on the updated noise library.

It may be understood that the indoor unit may determine the band of each sub-carrier signal each time the indoor unit sends data; or, the indoor unit may adjust the band of each sub-carrier signal when the indoor unit determines that update is available to the noise library, which are not specifically limited in the disclosure.

In some embodiments, the data transmission method further includes the following operations after sending, by the indoor unit, the communication data to the outdoor unit through the power line based on the second communication interval.

The indoor unit restores the communication interval with the outdoor unit to the first communication interval.

It may be understood that after the indoor unit sends the foregoing operation parameters to the outdoor unit based on the second communication interval, the indoor unit may restore the communication interval between the indoor unit itself and the outdoor unit to the first communication interval, so that an interval time period of sending adjacent data frames may be prolonged, which may reduce amount of data transmitted in the power line-based communication network and effectively prevent data transmission blocking.

In some embodiments, the operation of restoring, by the indoor unit, the communication interval with the outdoor unit to the first communication interval includes the following operations.

The indoor unit restores the communication interval with the outdoor unit to the first communication interval based on a feedback instruction of receiving the communication data fed back by the outdoor unit.

Exemplarily, after the outdoor unit receives complete operation parameters of the indoor unit, the outdoor unit may send a feedback instruction to the indoor unit based on the power line, and the indoor unit restores the communication interval between the indoor unit itself and the outdoor unit to the first communication interval based on the feedback instruction. In this way, it may ensure that after the outdoor unit completely acquires the operation parameters of the indoor unit, the communication interval between the indoor unit and the outdoor unit is restored to the first communication interval corresponding to a long time interval, which may effectively ensure reliability of communication between the indoor unit and the outdoor unit.

In some embodiments, as shown in FIG. 1, the indoor unit 100 includes an indoor unit controller 101 and a first PLC device 102.

Figure 3:
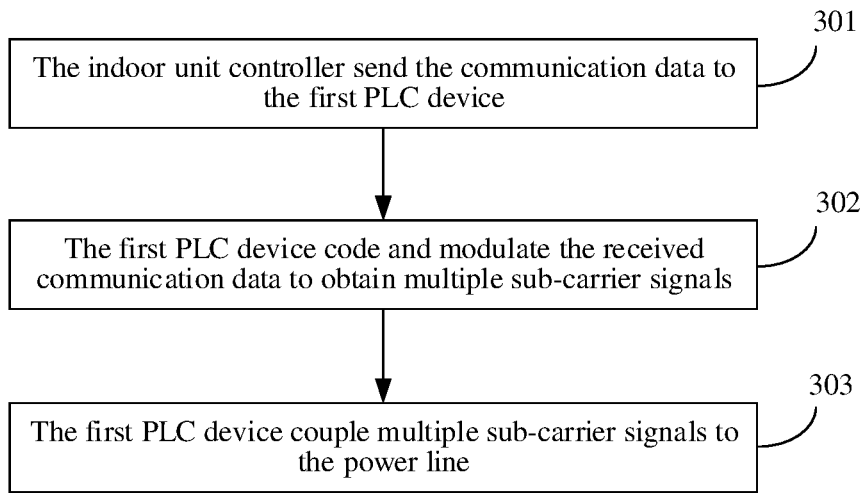
FIG. 3 is a schematic flowchart of an indoor unit modulating communication data into multiple sub-carrier signals and coupling multiple sub-carrier signals to a power line according to an embodiment of the disclosure.

Exemplarily, as shown in FIG. 3, the operation of modulating, by the indoor unit, the communication data into multiple sub-carrier signals, and coupling, by the indoor unit, multiple sub-carrier signals to the power line includes the following operations 301 to 303.

At 301, the indoor unit controller sends the communication data to the first PLC device.

Exemplarily, the indoor unit controller 101 may send the communication data to the first PLC device 102 based on one or more of the acquired operation parameters of the indoor unit.

At 302, the first PLC device codes and modulates the received communication data to obtain multiple sub-carrier signals.

Here, the first PLC device 102 may perform channel coding on the received communication data and modulate the coded signal, to obtain multiple sub-carrier signals.

Considering that serious impulse noise, narrowband noise, colored background noise, multi-path frequency selective fading or the like may exist in a power line channel, error correction coding may be performed to achieve reliable transmission of signals in the channel and reduce a bit error rate as much as possible. As long as distortion and code errors occurred to the signal during transmission are within an error correction range of an error correction code, the receiving side may demodulate data correctly, thereby ensuring correct data transmission. Exemplarily, the first PLC device 102 may code the communication data based on scrambling, Cyclic Redundancy Check (CRC), convolutional coding, bit interleaving, symbol interleaving, etc. A specific processing process thereof may refer to the related art, which is not elaborated here.

Exemplarily, the first PLC device 102 may modulate the coded signal by using a low-order quadrature amplitude modulation (QAM)-based constellation modulation mode. For example, it includes, but is not limited to a binary phase shift keying (BPSK) modulation mode, a quadrature phase shift keying (QPSK) modulation mode, or the like, which are not specifically limited in the disclosure.

At 303, the first PLC device couples multiple sub-carrier signals to the power line.

Exemplarily, the first PLC device 102 couples multiple sub-carrier signals to the power line through a coupling circuit. Each of the sub-carrier signals corresponds to a different band. The communication data is transmitted simultaneously by using multiple sub-carriers, which may enhance anti-interference abilities of PLC signals and ensure a successful communication rate of PLC communication in an interference environment.

In some embodiments, the data transmission method further includes the following operations.

The outdoor unit extracts multiple sub-carrier signals coupled on the power line, and demodulates and decodes multiple sub-carrier signals to restore the communication data.

In some embodiments, as shown in FIG. 1, the outdoor unit 200 includes an outdoor unit controller 201 and a second PLC device 202.

Figure 4:
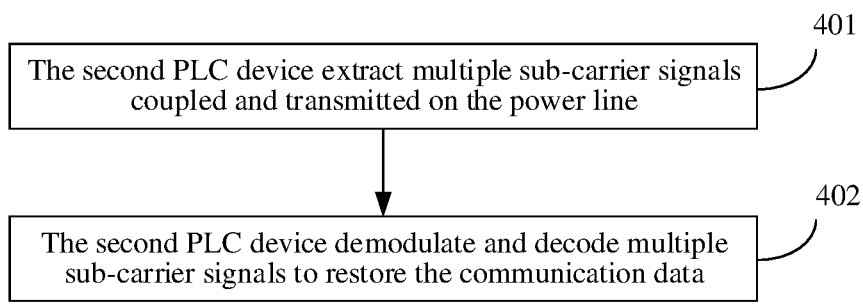
FIG. 4 is a schematic flowchart of an outdoor unit extracting multiple sub-carrier signals coupled on a power line and demodulating and decoding multiple sub-carrier signals according to an embodiment of the disclosure.

Exemplarily, as shown in FIG. 4, the operation of extracting, by the outdoor unit, multiple sub-carrier signals coupled on the power line, and demodulating and decoding, by the outdoor unit, multiple sub-carrier signals includes the following operations 401 and 402.

At 401, the second PLC device extracts multiple sub-carrier signals transmitted on the power line.

Exemplarily, the second PLC device 202 extracts multiple sub-carrier signals transmitted on the power line through a coupling circuit.

At 402, the second PLC device demodulates and decodes multiple sub-carrier signals to restore the communication data.

Exemplarily, the second PLC device 202 may demodulate and decode multiple sub-carrier signals to restore the communication data. It may be understood that demodulation is an inverse process of the foregoing modulation, and decoding is an inverse process of the foregoing coding, specific processing processes are not elaborated here.

In some embodiments, the data transmission method further includes the following operations.

The second PLC device sends the communication data to the outdoor unit controller in response to determining that the communication data conforms to a set communication protocol.

Exemplarily, when the second PLC device 202 determines that the restored communication data conforms to the set communication protocol, the second PLC device 202 determines that the communication data transmitted through the sub-carrier signal is successfully received, and may abandon demodulating and decoding other sub-carrier signals. Furthermore, the second PLC device 202 sends the communication data to the outdoor unit controller 201.

Here, the set communication protocol may be a protocol preset between the outdoor unit and the outdoor unit, which is not specifically limited in the disclosure.

In some embodiments, the data transmission method further includes the following operations.

The second PLC device discards the communication data in response to determining that the communication data does not conform to the set communication protocol.

Exemplarily, when the second PLC device 202 determines that the restored communication data does not conform to the set communication protocol, the second PLC device 202 discards the communication data transmitted through the sub-carrier signal, and demodulates and decodes other sub-carrier signals, until communication data conforming to the set communication protocol is obtained.

The PLC-based data transmission method for the air conditioner according to the embodiments of the disclosure is exemplified below in combination with an application example.

Figure 5:
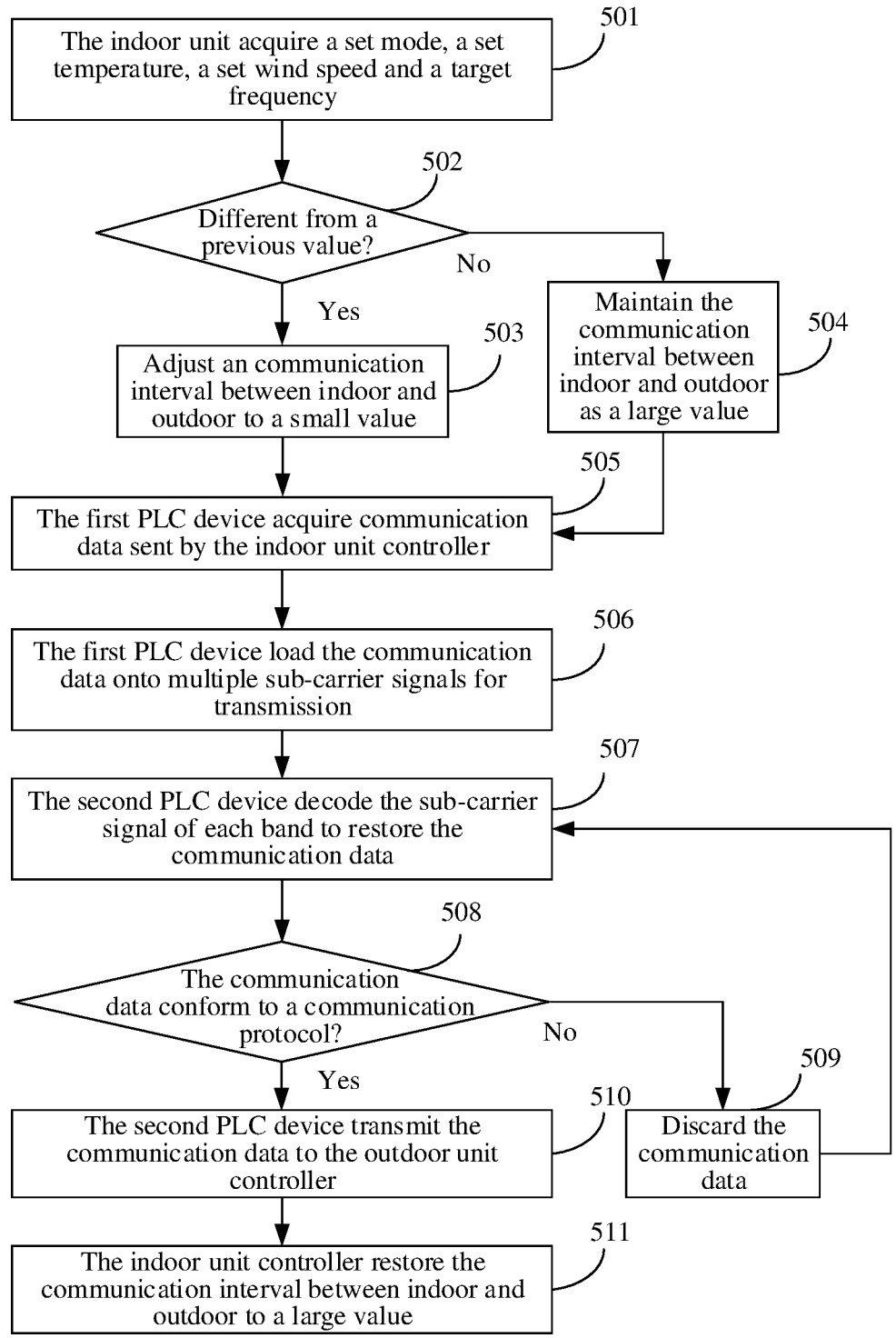
FIG. 5 is a schematic flowchart of a PLC-based data transmission method for an air conditioner in an application example of the disclosure.

As shown in FIG. 5, the PLC-based data transmission method for the air conditioner according to this application example includes the following operations 501 to 511.

At 501, the indoor unit acquires a set mode, a set temperature, a set wind speed and a target frequency.

Here, the indoor unit controller may acquire the operation mode, the set temperature, the set wind speed and the target frequency of the indoor unit.

Exemplarily, the indoor unit controller adjusts part of operation parameters based on input means such as a remote controller, a key, etc. For example, the indoor unit controller may receive control instructions of changing the operation mode, the set temperature or the set wind speed sent by the user through the remote controller, the indoor unit controller may update corresponding operation parameters based on the received control instructions.

Exemplarily, the indoor unit controller may acquire ambient temperature detected by the temperature sensor based on a set acquisition frequency, and determine whether the target frequency value is updated based on a difference between the ambient temperature and the set temperature. For example, the indoor unit controller selects a corresponding frequency value based on an interval corresponding to the difference, and determines whether the target frequency value is updated based on the selected frequency value; when the selected frequency value is different from a current target frequency value, the indoor unit controller updates the current target frequency value to the selected frequency value.

At 502, it is determined whether the value is different from a previous value, and operation 503 is executed when the value is different from the previous value; otherwise, operation 504 is executed.

Exemplarily, operation 503 is executed when the indoor unit controller determines that at least one of the acquired operation mode, set temperature, set wind speed or target frequency changes compared to corresponding historical parameters of a previous time period, and operation 504 is executed when the indoor unit controller determines that none of the acquired operation mode, set temperature, set wind speed and target frequency change.

At 503, a communication interval between indoor and outdoor is adjusted to a small value, and then operation 505 is executed.

Here, the indoor unit controller adjusts the communication interval between the indoor unit controller itself and the outdoor unit controller to the second communication interval.

At 504, the communication interval between indoor and outdoor is maintained as a large value, and then operation 505 is executed Here, the indoor unit controller maintains the communication interval between the indoor unit controller itself and the outdoor unit controller as the default first communication interval.

It should be noted that the first communication interval is greater than the second communication interval. Exemplarily, the first communication interval is 5 seconds, and the second communication interval is 50 milliseconds.

At 505, the first PLC device acquires communication data sent by the indoor unit controller.

Exemplarily, the indoor unit controller may send the communication data to the first PLC device based on one or more of current operation parameters. The first PLC device may perform channel coding on the received communication data and modulate the coded signal, to obtain multiple sub-carrier signals, and each of the sub-carrier signals corresponds to a different band.

At 506, the first PLC device loads the communication data onto multiple sub-carrier signals for transmission.

Exemplarily, the first PLC device couples multiple sub-carrier signals to the power line through a coupling circuit. Each of the sub-carrier signals corresponds to a different band. The communication data is transmitted simultaneously by using multiple sub-carriers, which may enhance anti-interference abilities of PLC signals and ensure a successful communication rate of PLC communication in an interference environment.

At 507, the second PLC device decodes the sub-carrier signal of each band to restore the communication data.

Exemplarily, the second PLC device extracts multiple sub-carrier signals transmitted on the power line through the coupling circuit. The second PLC device may demodulate and decode multiple sub-carrier signals to restore the communication data.

At 508, it is determined whether the communication data conforms to a communication protocol, and operation 509 is executed when the communication data does not conform to the communication protocol; otherwise, operation 510 is executed.

Here, the second PLC device determines, based on a set communication protocol, whether the restored communication data conforms to the communication protocol, and operation 509 is executed when the restored communication data does not conform to the communication protocol; otherwise, operation 510 is executed.

At 509, the second PLC device discards the communication data.

Here, when the second PLC device determines that the restored communication data does not conform to the set communication protocol, the second PLC device discards the communication data transmitted through the sub-carrier signal, and the process returns to 508 to continue demodulating and decoding other sub-carrier signals, until the communication data conforming to the set communication protocol is obtained.

At 510, the second PLC device transmits the communication data to the outdoor unit controller.

Exemplarily, when the second PLC device determines that the restored communication data conforms to the set communication protocol, the second PLC device determines that the communication data transmitted through the sub-carrier signal is successfully received, and may abandon demodulating and decoding other sub-carrier signals. The second PLC device sends the successfully received communication data to the outdoor unit controller.

At 511, the indoor unit controller restores the communication interval between indoor and outdoor to a large value.

Exemplarily, after the outdoor unit controller receives complete operation parameters on the indoor unit controller side, the outdoor unit controller sends a feedback instruction to the second PLC device, the second PLC device sends the feedback instruction to the first PLC device through the power line, the first PLC device sends the feedback instruction to the indoor unit controller, and the indoor unit controller restores the communication interval between the indoor unit controller itself and the outdoor unit controller to the first communication interval based on the feedback instruction. In this way, it may ensure that after the outdoor unit completely acquires the operation parameters of the indoor unit, the communication interval between the indoor unit and the outdoor unit is restored to the first communication interval corresponding to a long time interval, which may effectively ensure reliability of communication between the indoor unit and the outdoor unit.

It may be known from the above descriptions that in this application example, according to the PLC-based data transmission method for the air conditioner, firstly, the indoor unit acquires the set mode, the set temperature, the set wind speed and the target frequency, the communication interval between indoor and outdoor is based on a small value (corresponding to the second communication interval) in case of changing, and the communication interval between indoor and outdoor is based on a large value (corresponding to the first communication interval) in case of no changing; after the first PLC device acquires the communication data of the indoor unit controller, the first PLC device loads the communication data on multiple sub-carrier signals for transmission, and each of the sub-carrier signals corresponds to a different band; the second PLC device decodes each of the sub-carrier signals, and sends communication data which conforms to the communication protocol to the outdoor unit controller, and discards communication data which does not conform to the communication protocol, rather than sending the communication data. On one hand, the communication interval between the indoor unit and the outdoor unit may be determined according to operation states of the air conditioner, which may effectively reduce PLC-based data transmission frequency, thereby effectively avoiding data transmission blocking; on the other hand, simultaneous transmission is performed by using multiple sub-carrier signals, which may effectively increase anti-noise interference capability of PLC-based data transmission, thereby improving data transmission reliability.

An embodiment of the disclosure further provides an air conditioner. As shown in FIG. 1, the air conditioner includes an indoor unit 100 and an outdoor unit 200, the indoor unit 100 is connected to the outdoor unit 200 through refrigerant pipes, the indoor unit 100 and the outdoor unit 200 are connected to a power line 300 respectively and communicate via PLC signals transmitted on the power line 300. The indoor unit 100 and the outdoor unit 200 are configured to execute operations of the method according to the foregoing embodiments of the disclosure when the indoor unit and the outdoor unit run a computer program. Details may refer to descriptions of the foregoing method embodiments, and are not elaborated here.

Exemplarily, the indoor unit 100 includes an indoor unit controller 101 and a first PLC device 102. The indoor unit controller 101 may be communicatively connected to the first PLC device 102, for example, through a serial port data line. The first PLC device 102 is coupled and connected to the power line 300, to couple PLC signals to the power line and extract PLC signals from the power line 300.

Exemplarily, the outdoor unit 200 includes an outdoor unit controller 201 and a second PLC device 202. The outdoor unit controller 201 may be communicatively connected to the second PLC device 202, for example, through a serial port data line. The second PLC device 202 is coupled and connected to the power line 300, to couple PLC signals to the power line and extract PLC signals from the power line 300.

Here, the indoor unit controller 101 may be an indoor unit main control board, the outdoor unit controller 201 may be an outdoor unit main control board, the first PLC device 102 and the second PLC device 202 may include a PLC MCU (microprocessor) and a coupling circuit, the PLC MCU is connected to the power line 300 through the coupling circuit, and the PLC MCU is communicatively connected to the indoor unit controller or the outdoor unit controller. Details may refer to relevant design of PLC devices, and are not elaborated here.

In an exemplary embodiment, an embodiment of the disclosure further provides a storage medium, i.e., a computer storage medium. The storage medium may be a computer-readable storage medium, for example, including a memory having stored thereon a computer program, and the computer program may be executed by a processor of the air conditioner to implement operations of the method according to the embodiments of the disclosure. The computer-readable storage medium may be a Read Only Memory (ROM), a Programmable Read-Only Memory (PROM), an Erasable Programmable Read-Only Memory (EPROM), an Electrically Erasable Programmable Read- Only Memory (EEPROM), a flash memory, a magnetic surface memory, an optical disk, a Compact Disc Read-Only Memory (CD-ROM), or other memories.

Terms "first", "second" or the like involved in descriptions of the disclosure are only intended to distinguish similar objects, and do not represent a specific order for the objects. It may be understood that specific orders or sequences of "first", "second" or the like may be interchanged if allowable, to enable the embodiments of the disclosure described here to be implemented in sequences other than those illustrated or described here. Unless stated otherwise, "multiple" means at least two.

Furthermore, the technical solutions described in the embodiments of the disclosure may be arbitrarily combined there-between without conflict.

The above descriptions are only specific implementations of the disclosure, however, the scope of protection of the disclosure is not limited thereto. Any variation or replacement easily conceived by those skilled in the art within the technical scope disclosed by the disclosure should be included in the scope of protection of the disclosure. Therefore, the scope of protection of the disclosure should be subjected to the scope of protection of claim.

The invention claimed is:

1. A Power Line Communication (PLC)-based data transmission method for an air conditioner, the air conditioner comprising an outdoor unit and an indoor unit connected to a power line respectively, the method comprising:
   acquiring, by the indoor unit, operation parameters;
   adjusting, by the indoor unit, a communication interval with the outdoor unit from a first communication interval to a second communication interval, in response to determining, by the indoor unit, that the operation parameters meet a set condition; and
   sending, by the indoor unit, communication data to the outdoor unit through the power line based on the second communication interval,
   wherein the sending, by the indoor unit, the communication data to the outdoor unit through the power line comprises:
      modulating, by the indoor unit, the communication data into a plurality of sub-carrier signals, and coupling, by the indoor unit, the plurality of sub-carrier signals to the power line, and
      each of the plurality of sub-carrier signals corresponding to a band, and the first communication interval greater than the second communication interval, wherein the bands of the plurality of sub-carrier signals are different from one another.

2. The PLC-based data transmission method of claim 1, wherein the determining, by the indoor unit, that the operation parameters meet the set condition comprises: determining, by the indoor unit, that at least one of acquired operation mode, set temperature, set wind speed or target frequency changes.

3. The PLC-based data transmission method of claim 1, further comprising:
   maintaining, by the indoor unit, the first communication interval in response to determining that the operation parameters are the same as historical operation parameters of a previous time period; and
   sending, by the indoor unit, the communication data to the outdoor unit through the power line based on the first communication interval.

4. The PLC-based data transmission method of claim 1, further comprising:
   restoring, by the indoor unit, the communication interval with the outdoor unit to the first communication interval, after the sending, by the indoor unit, the communication data to the outdoor unit through the power line based on the second communication interval.

5. The PLC-based data transmission method of claim 4, wherein the restoring, by the indoor unit, the communication interval with the outdoor unit to the first communication interval comprises:
   restoring, by the indoor unit, the communication interval with the outdoor unit to the first communication interval based on a feedback instruction of receiving the communication data fed back by the outdoor unit.

6. The PLC-based data transmission method of claim 1, wherein:
   the indoor unit comprises an indoor unit controller and a first PLC device; and
   the modulating, by the indoor unit, the communication data into the plurality of sub-carrier signals, and the coupling, by the indoor unit, the plurality of sub-carrier signals to the power line comprise:
      sending, by the indoor unit controller, the communication data to the first PLC device;
      coding and modulating, by the first PLC device, the received communication data to obtain the plurality of sub-carrier signals; and
      coupling, by the first PLC device, the plurality of sub-carrier signals to the power line.

7. The PLC-based data transmission method of claim 1, further comprising:
   extracting, by the outdoor unit, the plurality of sub-carrier signals coupled on the power line, and demodulating and decoding, by the outdoor unit, the plurality of sub-carrier signals to restore the communication data.

8. The PLC-based data transmission method of claim 7, wherein:
   the outdoor unit comprises an outdoor unit controller and a second PLC device; and
   the extracting, by the outdoor unit, the plurality of sub-carrier signals coupled on the power line, and the demodulating and decoding, by the outdoor unit, the plurality of sub-carrier signals comprise:
      extracting, by the second PLC device, the plurality of sub-carrier signals coupled on the power line; and
      demodulating and decoding, by the second PLC device, the plurality of sub-carrier signals to restore the communication data.

9. The PLC-based data transmission method of claim 8, further comprising:
   sending, by the second PLC device, the communication data to the outdoor unit controller in response to determining that the communication data conforms to a set communication protocol.

10. The PLC-based data transmission method of claim 9, further comprising:
    discarding, by the second PLC device, the communication data in response to determining that the communication data does not conform to the set communication protocol.

11. The PLC-based data transmission method of claim 1, further comprising:
    determining, by the indoor unit, the band of each of the plurality of sub-carrier signals based on a pre-built noise library,
    wherein the noise library comprises a noise band whose noise amplitude value is equal to or greater than a set threshold, and the band of each of the plurality of sub-carrier signals is different from the noise band.

12. The PLC-based data transmission method of claim 11, further comprising:
    acquiring, by the indoor unit, environmental noise data on the power line;
    updating, by the indoor unit, the noise library based on a noise band in the environmental noise data whose noise amplitude value is equal to or greater than the set threshold; and
    adjusting, by the indoor unit, the band of each of the plurality of sub-carrier signals based on the updated noise library.

13. An air conditioner comprising:
    an indoor unit and an outdoor unit connected to a power line respectively,
    wherein the indoor unit and the outdoor unit are configured to execute the PLC-based data transmission method of claim 1 when the indoor unit and the outdoor unit run a computer program.

14. A non-transitory computer-readable storage medium, having stored thereon a computer program that causes a computer to implement the PLC-based data transmission method of claim 1.

\* \* \* \* \*